United States Patent [19]
Palinkas

[11] 3,805,585
[45] Apr. 23, 1974

[54] TIMEPIECE TESTING DEVICE

[76] Inventor: Sandor Palinkas, 2031 McKinley St., Philadelphia, Pa. 19149

[22] Filed: Feb. 16, 1972

[21] Appl. No.: 226,869

[52] U.S. Cl. .................................................. 73/6
[51] Int. Cl. ..... G04f 5/00, G04f 11/08, G04b 17/12
[58] Field of Search ........................................ 73/6

[56] References Cited
UNITED STATES PATENTS

| 3,370,456 | 2/1968 | Jucker | 73/6 |
| 3,395,566 | 8/1968 | Jucker | 73/6 |
| 3,238,764 | 3/1966 | Greiner | 73/6 |

Primary Examiner—Richard C. Queisser
Assistant Examiner—Frederick Shoon
Attorney, Agent, or Firm—Caesar, Rivise, Bernstein & Cohen

[57] ABSTRACT

A measuring device is provided for determining the accuracy of a timepiece. The measuring device can be used for measuring the accuracy of timepieces having various different tick or oscillation rates. The measuring device has means for picking up the tick of a timepiece movement and generating a tick pulse signal for each tick of the timepiece. A standard frequency generator and a plurality of counting means are also provided. The first counting means is responsive to the standard generator for generating signals at predetermined periods of time. A second counting means is responsive to the tick signals for counting a predetermined number of the tick signals. The third counting means is provided for counting the tick signals. Decoding means are provided which are responsive to the second counting means and the signals from the first counting means for determining and indicating the correct tick rate of the timepiece. Logic means are provided which are responsive to the decoding means and the third counter for generating an output signal after the timepiece has ticked a predetermined number of times based on the number of ticks which are required for the timepiece in a predetermined time interval at its correct tick rate. Comparing means are provided which are responsive to the output signal and the first counting means for determining the accuracy of the timepiece.

10 Claims, 10 Drawing Figures

TIMEPIECE TESTING DEVICE

This invention relates generally to measuring and testing and more particularly to a timepiece testing device.

Presently available timepiece testing and measuring devices are either too sophisticated and, therefore, too expensive or are too simplistic and are not capable of determining the accuracy of the various timepieces that are presently available and need repair.

Moreover, even in sophisticated timepiece measuring devices, too long a period of time is required to determine the accuracy of the timepiece. Another disadvantage of the available measuring devices is the fact that there is normally no visual inspection means available to determine whether the measuring device has accurately determined the daily error of the timepiece.

In addition to being extremely expensive, the timepiece measuring devices which are available for measuring the accuracy of the various different types of timepieces that are in need of repair are also difficult to operate. Moreover, when the measuring device itself is out of order, there is normally no way in which this fact can be determined by the operator.

It is, therefore, an object of the invention to overcome the aforementioned disadvantages.

Another object of the invention is to provide a new and improved measuring device for determining the accuracy of timepieces.

Another object of the invention is to provide a new and improved measuring device which is capable of providing in a comparatively short period of time an accurate reading as to the number of minutes and seconds gained or lost by the watch in a day.

Still another object of the invention is to provide a new and improved timepiece measuring device which will, in approximately 6 seconds, determine not only the type of timepiece tested, but also the accuracy thereof.

Still another object of the invention is to provide a new and improved timepiece measuring device which has a unique indicator for visually displaying the type of timepiece movement that is being detected.

Yet another object of the invention is to provide a new and improved timepiece testing device which has visual display means which enable the operator thereof to check the accuracy of the measuring device and/or the timepiece being measured.

These and other objects of the invention are achieved by providing a measuring device for determining the accuracy of the timepiece which has means for picking up the ticking of a timepiece movement and generating a tick pulse signal for each tick or cycle of the timepiece. A standard frequency generator and a plurality of counting means are provided. The first counting means is responsive to the standard generator for generating signals at predetermined periods of time. The second counting means is responsive to the tick signals for counting a predetermined number of tick signals. The third counting means is for counting the number of ticks. Decoding means are also provided which are responsive to the second counting means and the signals from the first counting means for determining and indicating the correct tick rate of the timepiece. Also provided are logic means responsive to the decoding means and the third counter for generating an output signal after the timepiece has ticked a predetermined number of times based on the number of ticks required for the timepiece in a 6 second time interval at the correct tick rate of the timepiece. Comparing means are also provided which are responsive to the output signal and to the first counting means for determining the accuracy of the timepiece by comparing the amount of time required for the timepiece to generate the predetermined number of ticks required to the 6 second signal generated by the first counter.

Additional features of the invention include display means which are responsive to the decoder which indicate the type of timepiece that is being tested. This provides a visual check for the operator since if the indication is obviously wrong for a timepiece, the clock rate of which is known to the operator, it means that the timepiece is relatively inaccurate. In the alternative, the constant inaccuracy of the display means will indicate that the measuring device itself is inaccurate. However, as will be seen hereinafter in greater detail, such an error would be evident immediately from the operation of the circuit.

Other objects and many of the attendant advantages of this invention will be readily appreciated as the same becomes better understood by reference to the following detailed description when considered in connection with the accompanying drawings wherein.

Figure 1:
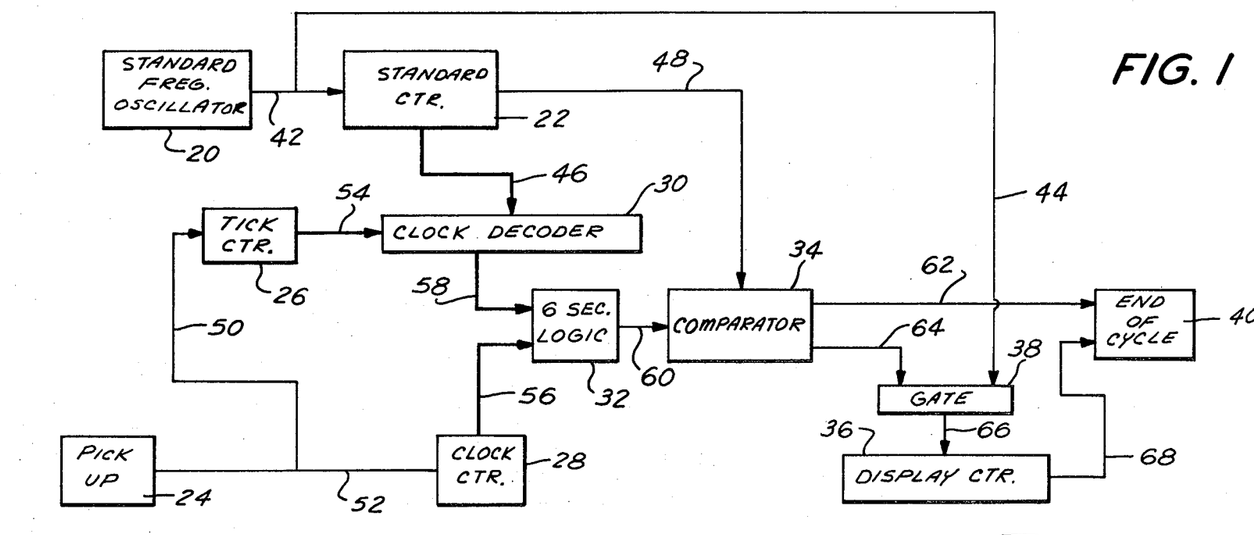
FIG. 1 is a block diagram of the overall circuitry used in the timepiece testing device embodying the invention.

Referring now in greater detail to the various figures of the drawings wherein like reference numerals refer to like parts, the overall block diagram of the timepiece testing device is shown in FIG. 1.

The timepiece testing device basically comprises a standard frequency oscillator 20 which preferably generates a signal having a frequency of 14,400 Hz (Hertz), a standard counter 22, pick-up means 24 for picking up the number of cycles or ticks of a timepiece being tested, a tick counter 26 for generating a signal upon a predetermined number of ticks, a clock counter 28 which counts the number of ticks or cycles picked up by said pick-up 24, a clock decoder 30, 6 second logic 32, a comparator 34, a display counter 36, gate logic 38 and end of cycle logic 40.

The standard frequency oscillator 20 includes pulsing and shaping means for providing an output signal on line 42 which is suitably shaped so that the standard counter 22 can count each cycle of the standard frequency oscillator.

The standard frequency oscillator 20 is also connected via lines 42 and 44 to the first input of gate logic 38. As will hereinafter be seen in greater detail, the standard counter 22 includes a plurality of stages, each of which provides an output representative of the state of the individual stage of the counter. These output signals are provided via cable 46 to the clock decoder 30. The standard counter 22 also has an output line 48 which normally receives an enabling signal after a 6 second interval of time has elapsed. For each type of timepiece that can be tested with the instant timepiece testing device, with the exception of one, the standard counter 22 provides the enabling signal on line 48 after a period of 6 seconds. As will hereinafter be seen in greater detail, the period is extended when a timepiece having a rate of 17,280 ticks per hour is tested.

The pick-up 24 is preferably comprised of a sensitive microphone which is connected to a suitable amplifier and pulse shaper so that for each tick or cycle of a timepiece being measured and tested, the pick-up generates an output signal representative thereof. The output signals of the pick-up 24 are provided via lines 50 to tick couter 26 and via line 52 to clock counter 28. The tick counter 26 provides output signals on lines 54 which are representative of the receipt by the tick counter 26 of a predetermined number of tick signals from the pickup 24. That is, normally 12 tick pulse signals are counted by the tick counter 26 which are used in combination with the output signals on cable 46 from the standard counter to determine the type of timepiece movement that is used in the timepiece being tested. That is, based on the amount of time that it takes to generate 12 ticks, the rate of the timepiece movement can be determined. There are, however, two exceptions where the tick counter is used to generate a signal upon receipt of 10 ticks and upon receipt of 5 ticks. These two signals are used for timepieces with relatively slow movements, such as in pendulum type clocks.

The clock counter 28 is preferably comprised of a binary counter having a plurality of stages, the outputs of which are provided via cable 56 to the 6 second logic 32. The clock decoder 30 is comprised of a plurality of stages which receive signals from the standard counter. The clock decoder also includes display means which are seen in greater detail hereinafter.

The clock decoder 30 is responsive to the signals provided on lines 54 from the tick counter 26 and the signals on cable 46 from the standard counter to indicate the type of watchpiece movement that is used in the timepiece being tested. That is, the clock decoder 30 is utilized to distinguish the rate of speed of the watchpiece movement of the timepiece tested. The instant timepiece testing device is capable of testing the following types of timepieces: tuning fork watches having frequencies of 360 Hz and 300 Hz and mechanical and electromechanical watch movements having the following rates: 36,000 ticks per hour, 28,800 ticks per hour, 21,600 ticks per hour, 21,000 ticks per hour, 19,800 ticks per hour, 18,000 ticks per hour, 17,280 ticks per hour, 16,200 ticks per hour, 14,400 ticks per hour, 12,000 ticks per hour, 9,000 ticks per hour, 7,200 ticks per hour and 3,600 ticks per hour.

Each of the stages of the clock decoder provides an output signal which is fed by cable 58 to the 6 second logic 32.

The 6 second logic 32 is responsive to both the signals from the clock counter 28 and the clock decoder 30 to provide an output signal on line 60 after the timepiece being tested provides the number of ticks that is required of the timepiece during a 6 second interval. That is, where a timepiece having a tick rate of 12,000 ticks per hour is being tested, the 6 second logic provides an enabling signal on line 60 after 20 tick signals are generated by pick-up unit 24. Thus, the enabling signal on line 60 is generated by the 6 second logic after a predetermined number of ticks or cycles is sensed by the pick-up unit 24 based on the number of ticks or cycles required from the timepiece being tested during a 6 second interval. Thus, where the timepiece being tested has a relatively high tick rate, the number of counts received by clock counter 28 and fed in the form of coded signals via lines 56 to 6 second logic 32 is higher than the number of ticks for a timepiece having a slower tick rate.

Thus, an enabling signal on line 60 is generated when the 6 second logic determines that a predetermined number of tick pulse signals has been presented by the pick-up 24 of the clock counter 28 based on the type of timepiece being tested.

The comparator 34 is provided to generate 2 signals. A first signal is provided on output line 62 and the second signal is provided on output line 64 thereof. An enabling signal is provided on line 62 when the enabling signals are provided on both lines 48 and 60 from the standard counter and the 6 second logic, respectively. An enabling signal is provided on output line 64 only when the signals on lines 48 and 60 are unequal. That is, as long as there is an enabling signal on only one of lines 48 and 60, there will be an enabling signal on line 64.

The comparator 34 is used in combination with the gate logic and the display counter to determine the accuracy of the timepiece being tested. If the timepiece being tested is accurate, the enabling signal on line 60 is generated at the same time that the enabling signal on line 48 is generated. This effectively prevents an enabling signal from being generated on line 64 for a period long enough to indicate an error to the display counter 36.

Where the enabling signal is provided on line 48 prior to an enabling signal being generated on line 60, the timepiece measuring device determines that the timepiece being tested is slow. If, however, the enabling signal is provided on line 60 prior to the generation of the enabling signal on line 48, the timeiece measuring device determines that the timepiece being tested is fast. Output line 62 of comparator 34 is connected to end of cycle logic 40. Line 64 of comparator 34 is connected to gating logic 38. The output line 44 from the standard frequency oscillator is also connected to the gating logic 38. The output of the gating logic 38 is provided via line 66 to the display counter 36. An enabling signal on line 64 opens gate 38 to pass the standard frequency oscillator pulses from lines 44 to the display counter 36. By using a time interval of 6 seconds for testing the timepiece and a standard frequency oscillator of 14,400 Hz, each pulse passed by gate 38 represents a second per day of inaccuracy of the timepiece tested.

The display counter 36, in addition to counting the number of pulses passed via gate 38, also includes a logic means for determining whether line 48 or line 60 received an enabling signal first. This distinguishes whether the timepiece being tested is slow or fast.

Display counter 36 also includes an output line 68 which is connected to the end of cycle logic 40 for recycling or ending a cycle where there is more than an hour error per day indicated for the timepiece being tested. This condition can occur not only where the timepiece is very accurate, but also where a spurious pulse has been picked up by pick-up unit 24 thereby indicating too large an error in the short period of time in which the timepiece is being tested.

The operation of the timepiece measuring device can, therefore, be seen to be as follows: The standard frequency oscillator in combination with the standard counter 22 is used to provide signals on lines 46 and 48 at predetermined intervals of time.

The enabling signal on line 48 is provided after 6 seconds except in the special case referred to hereinabove. The remaining enabling signals are provided by the standard counter on lines 46 and are provided at intermediate predetermined intervals to enable the clock decoder 30 to determine, based on the number of seconds required to generate the 12 ticks to tick counter 26, the type of timepiece mechanism that is being tested.

The clock decoder provides via signals on line 58 enabling signals to the 6 second logic to enable the 6 second logic to generate on line 60 an enabling signal when the pick-up unit 24 has detected a predetermined number of ticks representative of the number of ticks that should be picked up during a predetermined time interval from the type of timepiece being tested.

Comparator 34 generates on line 64 an enabling signal for a period of time equal to the amount of time that the enabling signals on lines 48 and 60 are unequal. When the timepiece being tested is accurate, the enabling signal on line 60 is generated at the same time as the enabling signal on line 48 and the comparator thereby prevents the gate 38 from passing any pulses to the display counter indicative of inaccuracy of the timepiece.

Where the enabling signal is received by the comparator from line 48 prior to the enabling signal on line 60, the gating logic 38 passes signals from line 44 to line 66 to the display counter 36 until the enabling signal is received on line 60. Similarly, if the enabling signal is provided on line 60 prior to the enabling signal on line 48, the gating logic 38 passes the standard oscillator pulse signals from line 44 to line 66 and on to the display counter until such time as both lines 48 and 60 have an enabling signal generated thereon.

Where the enabling signal is received from line 48 prior to the enabling signal on line 60, the display counter indicates that the timepiece is slow. Where the enabling signal is received on line 60 prior to the receipt of the signal on line 48, the timepiece is indicated by the display counter to be fast. The display counter presents the information as to the inaccuracy of the timepiece in the number of minutes and seconds that the timepiece gains or loses during a twenty-four hour day.

Figure 2:
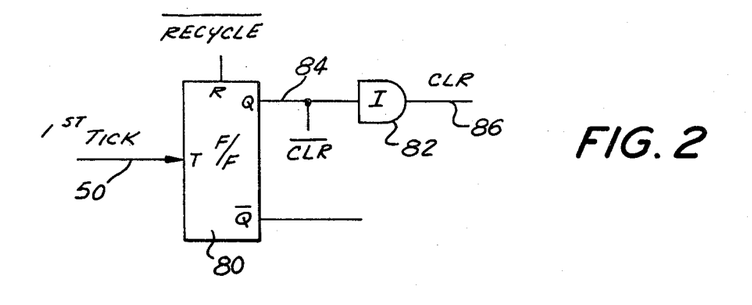
FIG. 2 is a schematic block diagram showing the logic of the control flip-flop for starting a test cycle of the testing device.

The cycle control logic is shown in FIG. 2. The control logic includes a flip-flop (F/F) 80 and an inverter 82. Flip-flop 80 is a conventional D flip-flop having a D input, a Q and a $\bar{Q}$ output, a trigger (T) input, a reset (R) input and a set (S) input. For clarity, only those inputs and outputs that are used in the circuit will be shown in connection with the flip-flop logic. The inverter 82 is represented by a semi-circle having an I therein. Each of the inverters used hereinafter uses the same logic designation. In addition to flip-flops and inverters, NOR and NAND gates are used in the logic and will be explained when the first of this type of gate is reached in the Specification.

The trigger input of flip-flop 80 is connected to line 50 from pick-up 24. The first tick pulse signal generated on line 50 causes the flip-flop 80 to be set thereby causing a change of level on the Q output line 84 from a low level to a high level. This signal is connected to inverter 82 which inverts the change of signal from a high to a low signal. These signals are the not clear and clear signals and are referred to hereinafter as $\overline{CLR}$ and CLR, respectively. The lowering of the CLR signal on line 86 enables all of the counters to start counting upon receipt of the next stepping pulse.

The flip-flop 80 also includes an input line to its reset input which receives the $\overline{RECYCLE}$ signal after a cycle has been completed. Immediately upon receipt of the $\overline{RECYCLE}$ signal, the various counters are cleared and the remaining logic in the measuring circuit logic preset.

Figure 3:
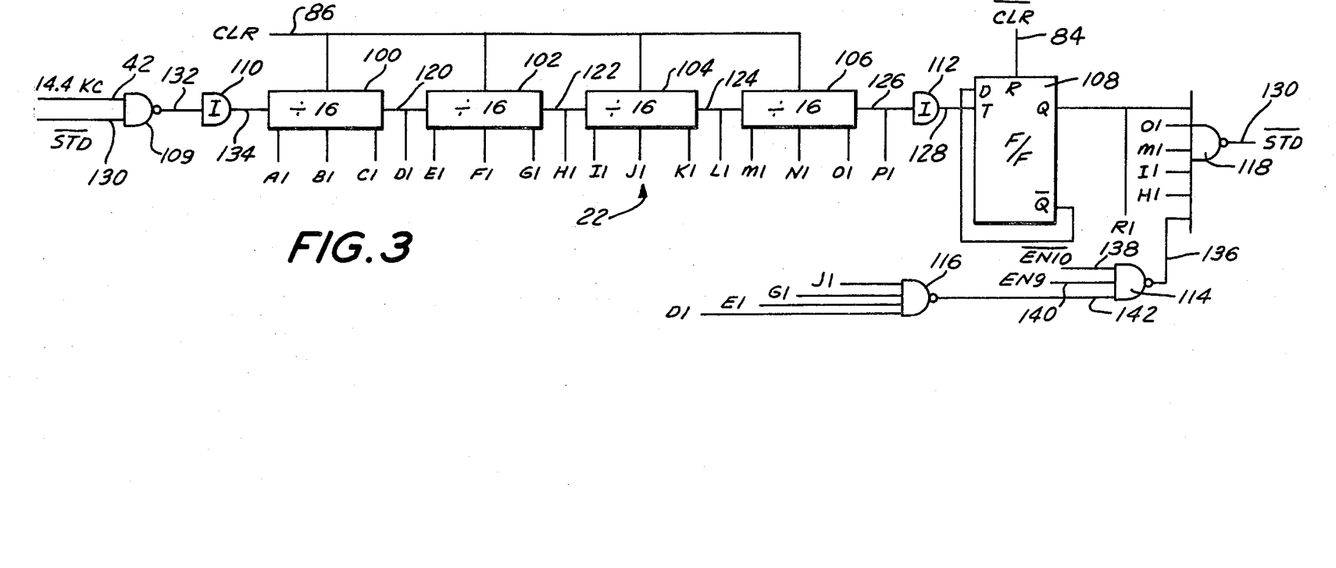
FIG. 3 is a schematic block diagram of the standard counter used.

The standard frequency counter and its associated logic are shown in FIG. 3. The standard counter 22 basically comprises four divide by sixteen ($\div 16$) counters 100, 102, 104 and 106, a flip-flop 108, a two input NAND gate 109, a pair of inverters 110 and 112, a three input NAND gate 114, a four input NAND gate 116, and a six input NAND gate 118. The $\div 16$ counters 100, 102, 104 and 106 are each comprised of four stage binary counters having four output lines representative of the states of each of the four stages of the counters. The NAND gates 109, 114, 116 and 118 differ only in the number of inputs used. The NAND gates used throughout the circuitry provide an output signal which is high when the gate is not enabled. The gate is enabled and produces a low output signal on its output line only when all of the inputs used have a high input signal thereto.

For example, a two input NAND gate 109 is enabled and thereby provides a low output signal only when both input lines have high inputs applied thereto. Similarly, NAND gate 118 is enabled only when each of the input signals thereto is high on each of the six inputs.

Each of the four $\div 16$ counters 100, 102, 104 and 106 is connected in cascade. That is, the most significant output of counter 100 is connected via line 120 to the step input of $\div 16$ counter 102, the most significant output of $\div 16$ counter 102 is connected to the step input of $\div 16$ counter 104 via line 122 and the most significant output of $\div 16$ counter 104 is connected to the step input of $\div 16$ counter 106 via line 124. The output lines of the four $\div 16$ counters 100 through 106 are labeled, respectively, A1, B1, C1, D1, E1, F1, G1, H1, I1, J1, K1, L1, M1, N1, O1 and P1 in order of increasing significance of the stages of the standard counter 22.

In addition, the flip-flop 108 acts as the most significant stage of the counter 22 and is connected by output line 126 of $\div 16$ counter 106, inverter 112 and input line 128 which is connected to the trigger input of flip-flop 108. It should be noted that the $\bar{Q}$ output of flip-flop 108 is connected to the D input thereof so that the flip-flop 108 can be set by the leading edge of the positive going signal when the carry is provided by counter 106 to the flip-flop 108.

The reset input of flip-flop 108 is connected to the $\overline{CLR}$ line from the cycle control flip-flop.

At the beginning of each cycle, the flip-flop 108 is reset. The Q output of flip-flop 108 provides the R1 output line which effectively indicates the state of flip-flop 108.

Thus, the signals provided on lines A1 through R1 represent the count in the standard counter 22. NAND gate 109 has a first input line 42 which is connected from the standard frequency oscillator and, thus, receives enabling pulses at the rate of 14.4 KH (kilohertz). The remaining input line 130 is connected to the output of NAND gate 118 shown on the extreme right of FIG. 3.

It should be noted that the legend "$\overline{STD}$" is provided adjacent line 130. Similarly, the legends "$\overline{CLR}$" and "CLR" have been used hereinabove. The notation used herein indicates when the signal is an enabling signal. That is, when it is the positive or high signal that is used as the enabling signal, the legend alone is used. For example, when CLR is used, it indicates that the CLR enabling signal is high. When the legend is used with the bar thereabove as is in $\overline{CLR}$, it indicates that the $\overline{CLR}$ is an enabling signal when the signal on the line is low.

The output of NAND gate 109 is connected via line 132 to inverter 110 which is in turn connected to the step input of ÷16 counter 100 via line 134.

Each of the CLR inputs of counters 100, 102, 104 and 106 is connected to line 86 from cycle control and is cleared at the beginning of the cycle via the CLR enabling signal thereon. The Q output of flip-flop 108 is connected to a first input of NAND gate 118. Four of the input lines to the NAND gate 118 are connected from the output lines O1, M1, I1 and H1 of the standard counter 22. The remaining input line 136 is connected from the output of NAND gate 114. When the R1, O1, M1, I1 and H1 lines and line 136 have high signals applied thereto, the NAND gate 118 provides an enabling signal on line 130.

The NAND gate 114 is normally disabled and thereby provides a high signal in line 136. Each of the input lines R1, O1, M1, I1 and H1 are high simultaneously exactly 6 seconds after the CLR signal is removed. Thus, the $\overline{STD}$ enabling signal is generated ideally 6 seconds after the $\overline{CLR}$ signal has been removed or 16 seconds after the first tick has been received from the pick-up unit 24. NAND gate 114 has three input lines 138, 140 and 142. The lines 138 and 140 are connected to two of the output lines of the decoder 30 and the third input line 142 is connected to the output of NAND gate 116.

NAND gate 116 includes four input lines which are connected to the output lines J1, G1, E1 and D1 of the standard counter 22. Gates 114 and 116, as will hereinafter be seen, are used to extend the time for the generation of the $\overline{STD}$ signal on line 130 when a timepiece having a tick rate of 17,280 ticks per hour is used.

Figure 4:
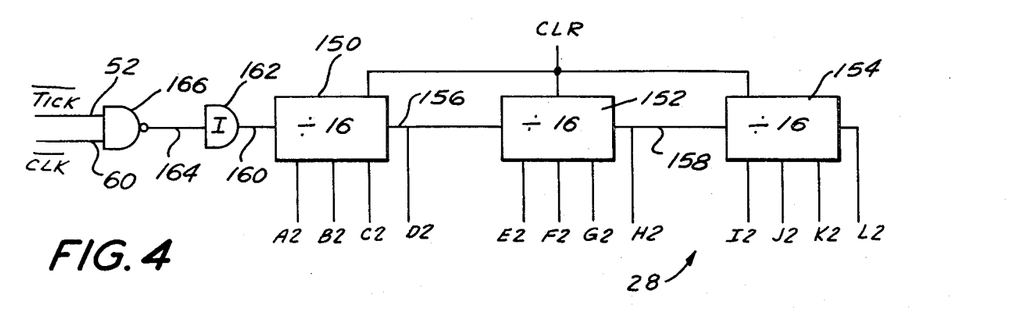
FIG. 4 is a schematic block diagram of a counting circuit for counting the number of ticks detected.

The clock counter 28 is shown in FIG. 4. Basically, the tick counter 28 comprises three ÷16 counters 150, 152 and 154. Counters 150, 152 and 154 are of substantially the same construction as the ÷16 counters 100 through 106. Each of the counters has four outputs, a stepping input and a clear input. Counters 150, 152 and 154 are also cascaded. Thus, the output line 156 of counter 150 is connected to the step input of counter 152 and the output line 158 of counter 152 is connected to the step input of counter 154. The step input 160 of counter 150 is connected via inverter 162 to output line 164 of NAND gate 166. NAND gate 166 includes a pair of inputs, the first of which is connected to line 52 from the pick-up unit 24 and the second of which receives the $\overline{CLK}$ signal which is provided from line 60, the output of the 6 second logic 32. The output lines of the twelve stages of the counter 28 are labeled in order of succeeding significance A2, B2, C2, D2, E2, F2, G2, H2, I2, J2, K2 and L2.

The operation of the clock counter 28 is as follows:

The tick signals provided by the pick-up unit 24 are provided via line 52 to the NAND gate 166. Since the $\overline{CLK}$ signal is normally high, line 60 is normally at a high level which enables the NAND gate 166 to be enabled each time a tick pulse is provided on line 52. Since the first tick from the timepiece is picked up on pick-up unit 24 and causes the cycle control unit to remove the CLR signal, the first tick causes the CLR and $\overline{CLR}$ signals to be removed thereby enabling the start of the count in the ÷16 counters 150, 152 and 154. The second pulse is then passed by the NAND gate 166 which is enabled on the second tick causing a high signal pulse on line 164 which is inverted to a low signal pulse on line 160. The trailing edge of the first pulse on line 160 causes the counter 150 to be stepped to the first count. Each succeeding tick pulse provided on line 52 is then passed to the counter to step the count thereof until such time as the $\overline{CLK}$ signal is enabled which thereby causes disabling of the NAND gate 166 as the input on line 60 goes low. Thus, the tick pulses received on line 52 cannot change the count in the counter 28 until the counter is cleared at the beginning of the next cycle.

Figure 5:
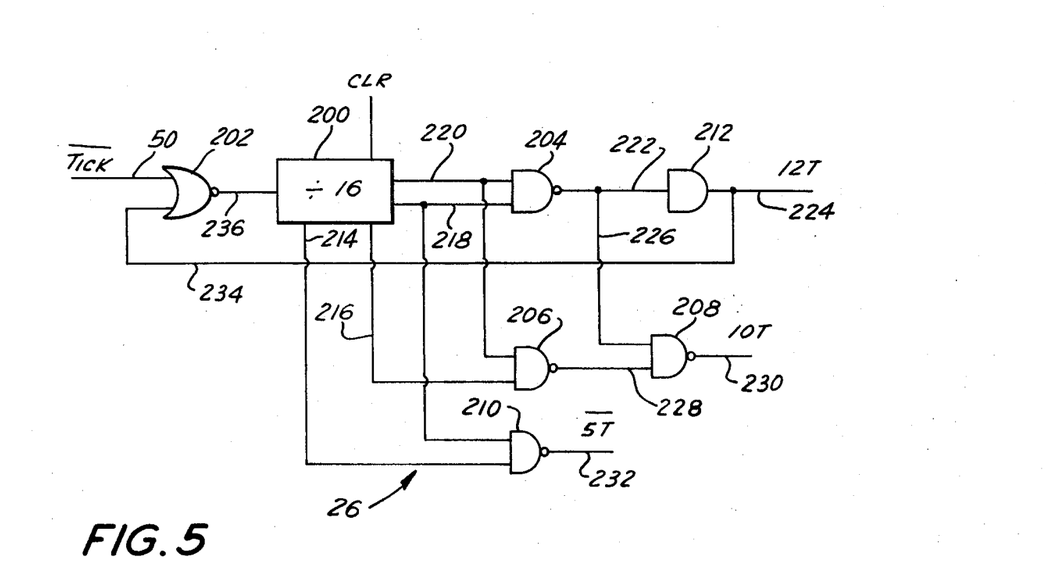
FIG. 5 is a schematic block diagram of a counting device for generating a signal upon a predetermined number of ticks detected.

The tick counter 26 is shown in FIG. 5. The tick counter 26 includes a ÷16 counter 200, a NOR gate 202, four two input NAND gates 204, 206, 208 and 210 and an inverter 212. The NOR gates used herein are enabled when either one or both of the inputs thereto have a high signal applied thereto. When the NOR gate is enabled, the output thereof goes low. If neither input is high, then the output thereof will go high.

The ÷16 counter 200 is similar to the previous ÷16 counters used herein. The ÷16 counter 200 also includes four output lines. The first output line 214 provides a signal from the first stage of the counter, a second output line 216 provides the output signal from the next stage of the counter and lines 218 and 220 in increasing order of significance provide the outputs of the third and fourth stages of the counter 200.

Thus, a high signal on line 220 is representative of an 8 in the counter, a high signal on line 218 is representative of an additional 4 count in the counter 200 and high signals on lines 216 and 214 represent an additional count of 2 and 1, respectively, when each of these lines are high. Output lines 220 and 218 are connected to the two inputs of NAND gate 204. The output of NAND gate 204 is connected via line 222 to the input of inverter 212. The output of inverter 212 is provided on line 224 which also includes the legend "12T".

The 12T signal is generated when the count of 12 is provided in counter 200. The output of NAND gate 204 is connected via line 226 to one of the inputs of NAND gate 208. The output of NAND gate 206 is connected via line 228 to the other input of NAND gate 208. Lines 220 and 216 are connected to the two inputs of NAND gate 206.

It should be noted that NAND gate 206 is enabled when the count of 10 is provided in counter 200. The NAND gate 204 is disabled unless the count in counter 200 is 12. Thus, the output line 226 is normally high. Therefore, as soon as gate 206 is enabled by the count reaching 10 in counter 200, the NAND gate 208 is disabled thereby providing a high signal on output line 230. It should be noted that the line 230 also has adjacent thereto the legend "10T" which represents the 10 tick enabling signal.

NAND gate 210 has its two inputs connected to output lines 218 and 214 of the counter 200. The NAND gate 210 is enabled when the count in counter 200 is 5. When the count reaches 5 in counter 200, the NAND gate 210 is enabled thereby providing an output line 232 thereof a low signal. Adjacent the line 232 the legend "5T" appears which is the 5 tick enabling signal for the decoder.

It should be noted that line 224, the 12T line, is connected via line 234 to the input of NOR gate 202. NOR gate 202 is connected at its other input line to the tick line 50 from pick-up unit 24. The output of NOR gate 202 is connected via output line 236 to the stepping input of counter 200.

In operation, the first tick generated by the pick-up unit 24 causes removal of CLR signal and the start of the count in the ÷16 counter 200. The second tick causes an input signal on line 50 to enable NOR gate 202 which causes the stepping of the ÷16 counter to the first count of 1. Each succeeding tick pulse signal on line 50 causes the stepping of the counter 200 to its next succeeding count. When the counter reaches the count of 5, the NAND gate 210 is enabled, when the count of 10 is reached, NAND gate 206 is enabled and when the count of 12 is reached, the NAND gate 204 is enabled.

When NAND gate 204 is enabled, however, it causes the output line 224 to go high thereby causing via input line 234 to NOR gate 202 disabling of the NOR gate 202 to further step ÷16 counter 200.

That is, the ÷16 counter is stepped on the trailing edge of a positive going signal on line 236. Since the tick pulse signals provided on line 50 are in the form of negative spikes, it is the enabling of the NOR gate 202 which causes the trailing edge on line 236 to cause the stepping of counter 200. However, by providing a constant high input signal to the NOR gate 202, it prevents the positive pulses from further disabling the NOR gate.

Figure 6:
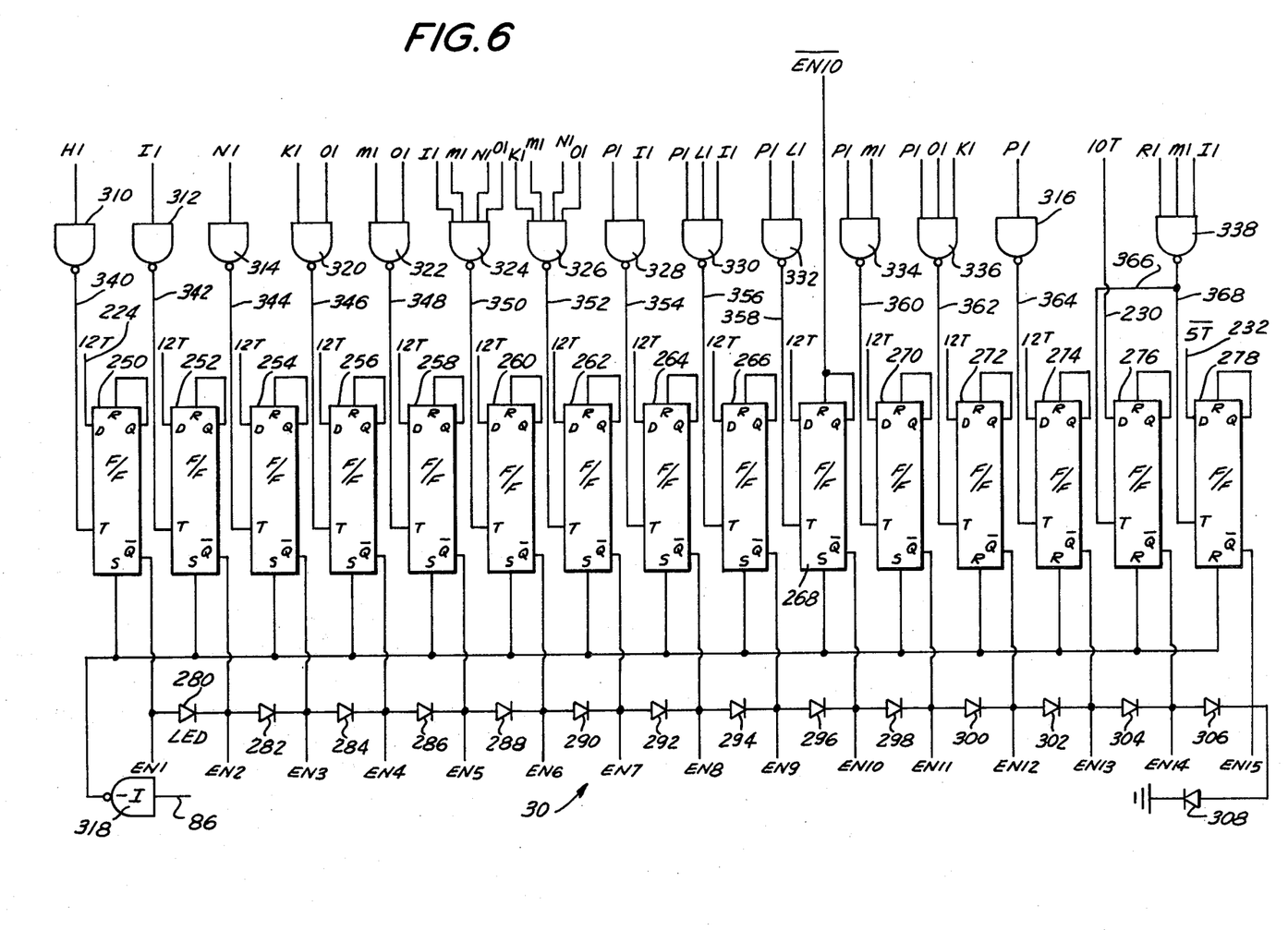
FIG. 6 is a schematic block diagram of the watchpiece decoder.

The decoder 30 is shown in FIG. 6. The clock decoder 30 basically comprises fifteen flip-flops 250, 252, 254, 256, 258, 260, 262, 264, 266, 268, 270, 272, 274, 276 and 278, fifteen light emitting diodes 280, 282, 284, 286, 288, 290, 292, 294, 296, 298, 300, 302, 304, 306 and 308, five inverters 310, 312, 314, 316 and 318 and ten NAND gates 320, 322, 324, 326, 328, 330, 332, 334, 336 and 338. Inverter 318 has its input connected to the CLR line 86 and its output connected to the set input of each of the flip-flops 250 through 278.

Flip-flop 250 has its trigger input line 340 connected to output line H1 of standard counter 22 via inverter 310. The Q output line of flip-flop 250 is connected to the reset input of flip-flop 250. It should be noted that in each of flip-flops 252 through 278, the Q output is also connected to the set input.

The D input line of flip-flop 250 is connected to output line 224 of the tick counter 26. Thus, upon reaching the 12th tick in the ÷16 counter 200 of the tick counter 26, the inverter 212 provides a high input signal on the D input of the flip-flop 250. It should be noted that flip-flops 252, 254, 256, 258, 260, 262, 264, 266, 268, 270, 272 and 274 each has its D input connected to the 12T line or line 224 of the tick counter 26. Flip-flops 276 and 278, however, have their D input lines connected to lines 230 and 232, respectively, of the tick counter 26. This will be explained in greater detail hereinafter.

The trigger input of flip-flop 252 is connected via line 342 to the output of inverter 312, the input of which is connected to output line I1 of standard counter 22. The trigger input of fli-flop 254 is connected via line 344 to the output of inverter 314, the input of which is connected to output line N1 of the standard counter 22.

Trigger input of flip-flop 256 is connected via line 346 to the output of NAND gate 320. The two input lines to NAND gate 320 are connected to the output lines K1 and O1 of the standard counter 22. The trigger input of flip-flop 258 is connected via line 348 to the output of NAND gate 322. The inputs to NAND gate 322 are connected to the output lines M1 and O1 of the standard counter 22. Similarly, the trigger input of flip-flop 260 is connected via line 350 to the output of NAND gate 324, the inputs of which are connected to the output lines I1, M1, N1 and O1 of standard counter 22. The trigger input of flip-flop 262 is connected via line 352 to the output of NAND gate 326, the inputs of which are connected to lines K1, M1, N1, and O1 of standard counter 22. The trigger input of flip-flop 264 is connected via line 354 to the NAND gate 328, the inputs of which are connected to output lines P1 and I1 of standard counter 22. The trigger input of flip-flop flop 266 is connected via line 356 to the output of NAND gate 330, the inputs of which are connected to output lines P1, L1 and I1 of standard counter 22. The trigger input of flip-flop 268 is connected via line 358 to the output of NAND gate 332. NAND gate 332 has its inputs connected to output lines P1 and L1 of the standard counter 22.

The trigger input of flip-flop 270 is connected via line 360 to the output of NAND gate 334. The inputs of NAND gate 334 are connected to output lines P1 and M1 of the standard counter 22. The trigger input of flip-flop 272 is connected via line 362 to the output of NAND gate 336. The input lines to NAND gate 336 are connected to output lines P1, O1 and K1 of standard counter 22. The trigger input of flip-flop 274 is connected via line 364 to the output of inverter 316. The input to inverter 316 is connected to the output line P1 of the standard counter. The trigger input of flip-flop 276 is connected via line 366 to the output of NAND gate 338. Similarly, the trigger input of flip-flop 278 is connected via line 368 to NAND gate 338. The input lines of NAND gate 338 are connected to the output lines R1, M1 and I1 of the standard counter 22.

The $\overline{Q}$ output lines of flip-flops 250 through 278 are labeled EN1 through EN15, respectively. The light emitting diode 280 is connected between output line EN1 and output line EN2. The light emitting diode 282 is connected between lines EN2 and EN3, light emitting diode 284 is connected between line EN3 and line EN4, light emitting diode 286 is connected between lines EN4 and EN5, diode 288 is connected between lines EN5 and EN6, diode 290 is connected between lines EN6 and EN7, diode 292 is connected between lines EN7 and EN8, diode 294 is connected between lines EN8 and EN9, diode 296 is connected between lines EN9 and EN10, diode 298 is connected between lines EN10 and EN11, diode 300 is connected between lines EN11 and EN12, diode 302 is connected between lines EN12 and EN13, diode 304 is connected between lines EN13 and EN14, diode 306 is connected between lines EN14 and EN15 and diode 308 is connected between lines EN14 and ground.

It should be noted that each of the trigger inputs to the flip-flops 250 through 278 is connected to the output of different ones or combinations of the output lines of the standard counter 22 so that each of the flip-flops 250 through 278 receives a positive going signal after a different predetermined period of time at its trigger input. That is, flip-flop 250 is the first to receive a positive going pulse on its trigger input. As long as the 12T signal is not enabled, when line 340 goes positive, the flip-flop 250 is changed in state thereby causing the Q̄ output line EN1 to go positive. When output line EN1 goes positive, the diode 280 is forward biased thereby causing the light emitting diode 280 to conduct and thereby cause an illumination thereof. The next trigger enabling input signal is provided to flip-flop 252 via line 242. As soon as flip-flop 252 receives a trigger signal, it is changed in state causing the Q̄ output line EN2 to go high. The high output signal on line EN2 causes the diode 282 to be forward biased but removes the bias across diode 280 as the output voltage on line EN2 equals line EN1. This causes the diode 280 to lose illumination and diode 282 to be illuminated. As the standard counter is stepped, the trigger inputs of the next succeeding flip-flops 254, 256, and so on through 274 receive positive going signals thereat which cause the flip-flops to change state unless the 12 tick signal has been generated by the tick counter 26 and in the case of the flip-flops 276 and 278, the 10T or 5T signal had not been at a high level prior to the receipt of the triggering signal on lines 230 and 232, respectively.

Figure 7:
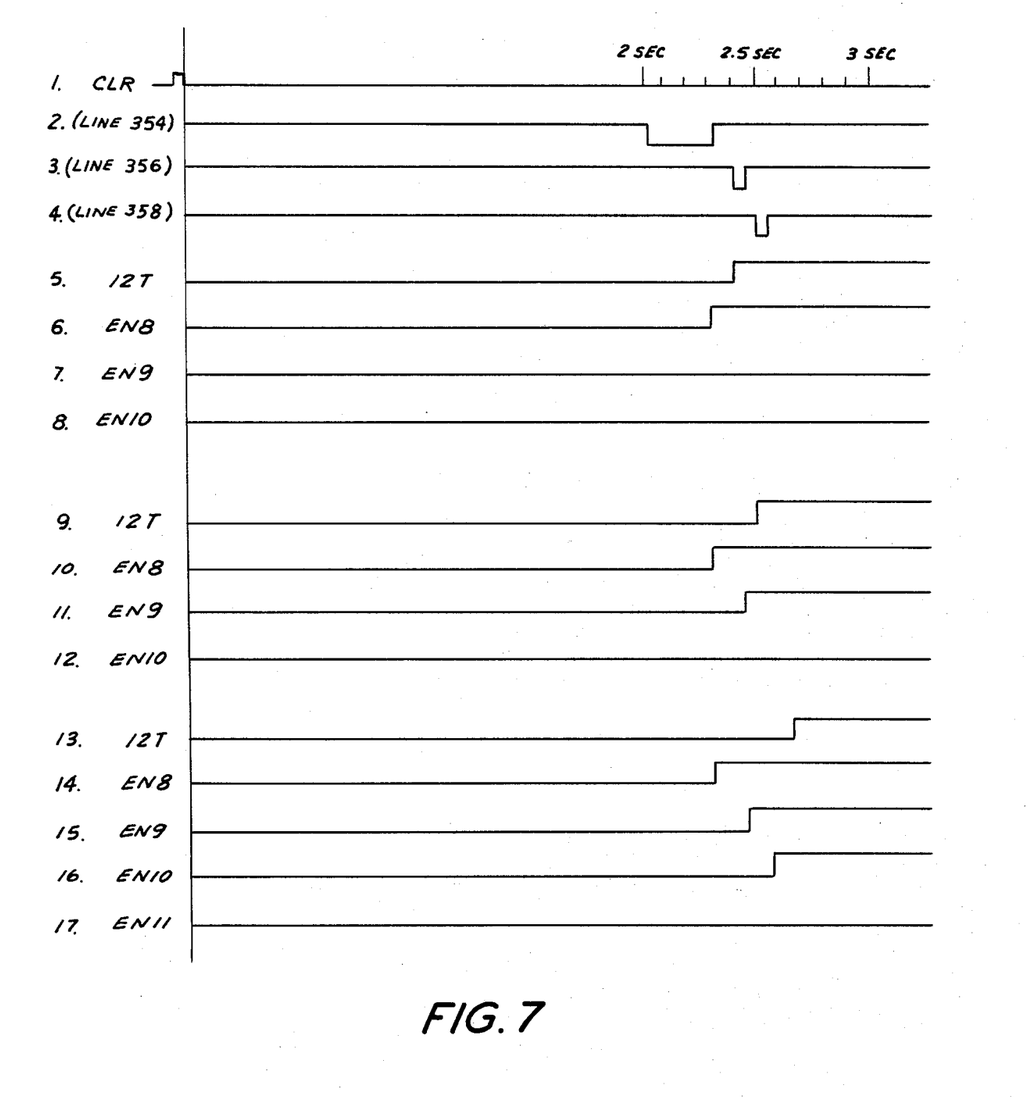
FIG. 7 is a diagrammatic representation of the signals generated throughout the decoder to facilitate explanation thereof.

The operation of the decoder is best understood by reference to the timing diagram of FIG. 7. Line 1 of the figure shows diagrammatically the lapse of time between the trailing edge of the CLR pulse and the time beginning with approximately 2 seconds elapsed is the next second graduated in tenths of a second.

Line 2 of FIG. 7 represents the signal on line 354 provided at the output of NAND gate 328 on line 354. It should be noted that line 354 first goes negative as the NAND gate 328 is enabled by the positive signals on lines P1 and I1. However, it is not until gate 328 is disabled as a result of either output line P1 or I1 going low, that a leading edge of a positive signal is provided to the trigger input of flip-flop 264 and thereby causes the triggering thereof.

Thus, as indicated by aligning the leading edge of the positive going portion of line 2 with the time on line 1, line 354 goes positive at about 2.31 seconds. Line 3 of FIG. 7 represents the output line 356 of NAND gate 330. As seen on line 3, the signal on line 356 goes negative and then returns going positive at approximately 2.45 seconds. On line 4, the signal on line 358 is shown. As seen therein, the output line 358 of the NAND gate 332 goes positive at approximately 2.56 seconds.

The subsequent enablings of gates 328, 330 and 332 are not shown since the first positive going signal on the output lines 354, 356 and 358 causes the setting of the flip-flops 264, 266 and 268, respectively. As soon as the flip-flops are reset, the connection of the Q output to the reset input latches the flip-flop and prevents the further leading edges from affecting the flip-flops. Also, the signals on lines 2, 3 and 4 are unaffected by the type of timepiece being tested. That is, standard frequency counter 22 alone controls the enabling of gates 328, 330 and 332 as well as the remaining input lines to the trigger inputs of each of the flip-flops 250 through 278. These triggering signals are, thus, provided in a predetermined sequence to the flip-flops. It should be understood, however, that the determination of which of the flip-flops 250 through 278 are not changed in state is determined by the timepiece being tested.

Line 5 of FIG. 7 shows the approximate position of the positive going pulse on line 224 of the tick counter 26, the 12T line, when a timepiece having a mechanism that is supposed to tick 18,000 times per hour is tested. As seen on line 5, the line 224 goes positive at approximately 2.4 seconds. On line 6 of FIG. 7, the signal on line EN8 is shown. EN8 reflects the state of flip-flop 264 which is triggered by the pulse on line 354 which goes positive at 2.31 seconds. Similarly, the output line EN8 goes positive at 2.31 seconds since flip-flop 264 is changed in state by the positive going pulse on line 352 at that time. On line 7 of the FIG. 7, the signal on line EN9 is shown. Because the 12T signal is provided to the D input of flip-flop 266 at approximately 2.4 seconds, the positive going signal on line 356 which occurs at 2.45 seconds is too late to cause the flip-flop 266 to change in state because the D input is positive. Similarly, as shown on line 8, the EN10 remains at the low voltage all of the way throughout because of the fact that the 12T has also prevented the positive going signal on line 358 from changing the state of flip-flop 268.

Lines 9, 10, 11 and 12 of FIG. 7 show the signals on lines 224, EN8, E9 and E10 when a timepiece having a tick rate of 17,280 is being tested. As can be seen on line 9, the 12th tick of a timepiece having a tick rate of 17,280 per hour is received in approximately 2.5 seconds. This means that both flip-flops 264 and 266 are triggered by the enabling signals on lines 354 and 356 because they occur prior to the 12T line going positive. This is indicated on lines 10 and 11 which show both the EN8 and EN9 lines going positive. However, line EN10 stays at the same level throughout because of the fact that the positive going edge on line 358 does not reach flip-flop 268 until 2.56 seconds which is too late since the 12T signal to the D input thereof has already gone positive.

Lines 13 through 17 show the conditions of the 12T, EN8, EN9, EN10 and EN11 lines when the timepiece being tested has a tick rate of 16,200 ticks per hour. The 12th tick of such a watch is normally received at approximately 2.7 seconds. Accordingly, as indicated by lines 14, 15 and 16 of FIG. 7, each of the flip-flops associated with the EN8, EN9 and EN10 lines has been triggered prior to the receipt of the 12th tick from the timepiece having a 16,200 tick per hour rate. However, the line 17 indicates that the output line EN11 of flip-flop 270 stays at a low level since the positive going pulse on line 360 is not received by the trigger input of flip-flop 270 prior to the D input going positive.

It should be noted that the decoder 30 accurately determines the preferred tick rate of a timepiece tested as long as the timepiece is accurate up to ±10 minutes in a day. That is, as long as the timepiece does not gain more than 10 minutes or lose more than 10 minutes a day, the decoder is sufficiently flexible to accurately determine the type of timepiece mechanism that is being tested.

It should be noted that the 12T signal is not used for either the flip-flop 276 or flip-flop 278. The reason for this is that the flip-flop 276 is used to detect a tick rate of 7,200 ticks per hour, which is 2 ticks per second. The flip-flop 278 is used to detect a tick rate of 3,600 ticks per hour, which is a tick rate of 1 tick per second. Thus, if 12 ticks were used to disable flip-flop 276, this could not occur until a full 6 seconds after the $\overline{CLR}$ pulse if the timepiece was exactly accurate. Since such a timepiece could be slow, it would be impossible within 6 seconds to prevent flip-flop 278 from being reset.

With respect to a tick rate of 1 per second, it is necessary that flip-flop 278 be disabled prior to 6 seconds also. Accordingly, the 10T signal is connected to the D input of flip-flop 276 and the $\overline{5T}$ signal is connected to the D input of flip-flop 278.

Since the flip-flops 276 and 278 are the last in the row of flip-flops and since the tick rates of the timepieces identified are one-half of the rates of each other, the D inputs of both are driven by the output of NAND gate 338.

Since the flip-flop 278 is the last of the row of flip-flops, the $\overline{5T}$ signal is used at the D input so that when the positive going pulse on line 368 is supplied to the trigger input of flip-flop 278, flip-flop 278 changes as a result of the low signal at the D input. A positive signal on line EN15 causes the light emitting diode 308 to be energized since the diode 308 is forward biased between the positive signal on line EN15 and ground.

Figure 8:
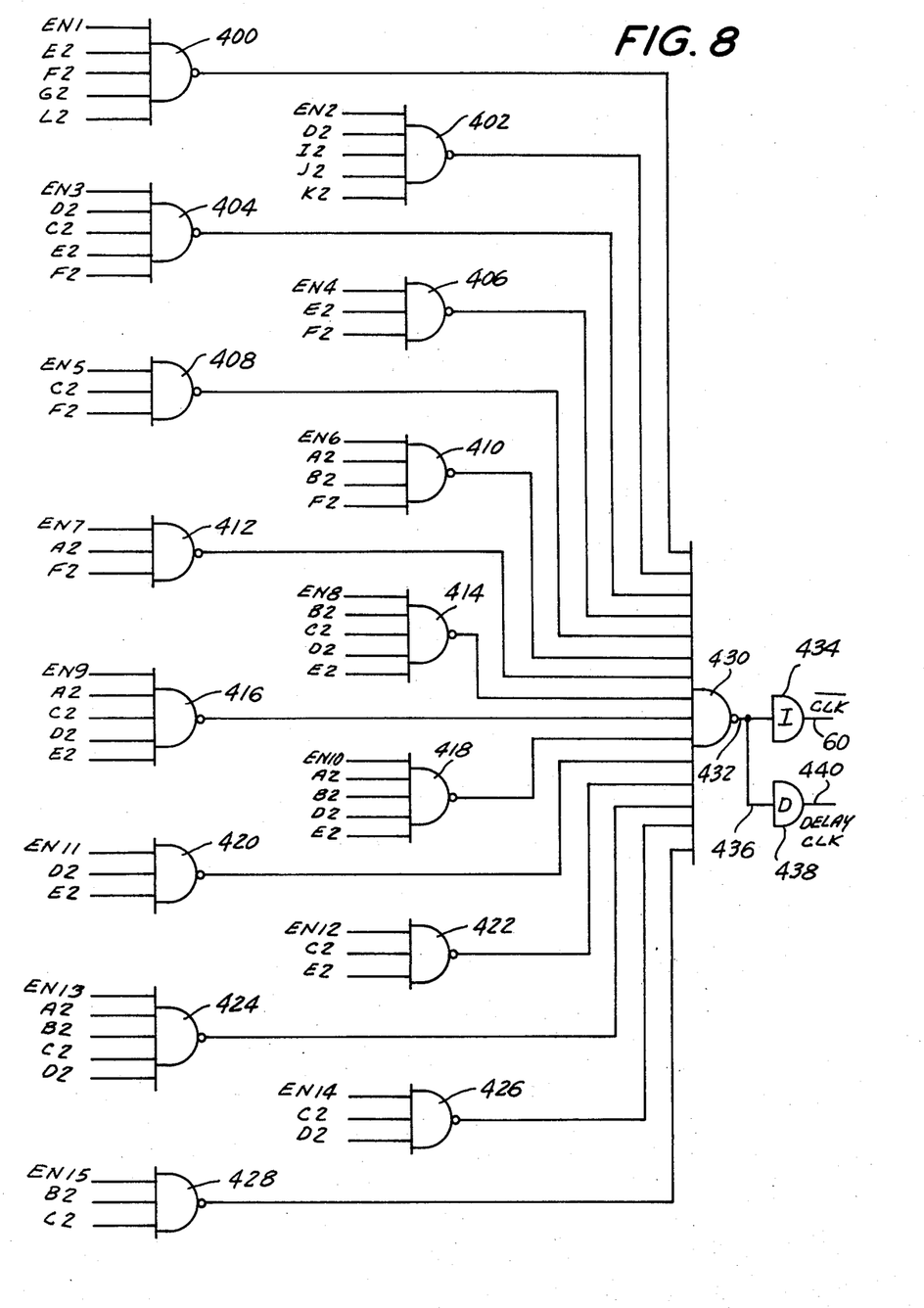
FIG. 8 is a schematic block diagram of the 6 second logic.

It can, therefore, be seen that the light emitting diodes 280 through 308 are lit in sequence until the diode associated with the timepiece being measured is triggered. The illumination of the following light emitting diodes represents the timepiece having the following tick rates:

diode 280 - 360 Hz
diode 282 - 300 Hz
diode 284 - 36,000 ticks per hour
diode 286 - 28,800 ticks per hour
diode 288 - 21,600 ticks per hour
diode 290 - 21,000 ticks per hour
diode 292 - 19,800 ticks per hour
diode 294 - 18,000 ticks per hour
diode 296 - 17,280 ticks per hour
diode 298 - 16,200 ticks per hour
diode 300 - 19,800 ticks per hour
diode 302 - 12,000 ticks per hour
diode 304 - 9,000 ticks per hour
diode 306 - 7,200 ticks per hour
diode 308 - 3,600 ticks per hour Referring to FIG. 8 wherein the 6 second logic is shown, it can be seen that the 6 second logic basically comprises 15 NAND gates, each of which is adapted to be used with a different one of the type of timepieces being tested and a 15 input NAND gate which is connected in such a manner that the enabling of any one of the other NAND gates causes an enabling of the $\overline{CLK}$ signal on line 60.

The 6 second logic, thus, comprises the following NAND gates: 400, 402, 404, 406, 408, 410, 412, 414, 416, 418, 420, 422, 424, 426 and 428. The output of each of gates 400 through 428 is connected to a different input of gate 430. The output of each stage of the decoder 30 is connected to a different one of the NAND gates 400 through 428. That is, the output lines EN1 through EN15 are connected, respectively, to a different one of the NAND gates 400 through 428.

In addition to the EN1 input line to NAND gate 400, NAND gate 400 has four input lines which are connected to the outputs of different stages of the clock counter 28. Thus, output lines E2, F2, G2 and L2 of clock counter 28 are connected to NAND gate 400.

In addition to output line EN2 of the decoder being connected to the input of NAND gate 402, output lines D2, E2, J2 and K2 of the clock counter 28 are connected to the remaining inputs of NAND gate 402. an addition to output line EN3 of decoder 30, the output lines B2, C2, E2 and F2 of the clock counter 28 are connected to the other inputs of NAND gates 404. In addition to the output line EN4 of the decoder being connected to NAND gate 406, output lines E2 and F2 of counter 28 are connected thereto. The input lines connected to NAND gate 408 are EN5, C2 and F2 output lines. The lines connected to the NAND gate 410 are output lines EN6, A2, B2 and F2. The output lines of the decoder and clock counter connected to NAND gate 412 are lines EN7, A2 and F2.

The output lines of the decoder and the clock counter connected to NAND gate 414 are lines EN8, B2, C2, D2 and E2. The output lines of the decoder and clock counter connected to NAND gate 416 are lines EN9, A2, C2, D2 and E2. The output lines of the decoder and clock counter connected to NAND gate 418 are lines EN10, A2, B2, D2 and E2.

In addition to output line EN11 of the decoder, output lines D2 and E2 of the clock counter are connected to NAND gate 420. The lines EN12, C2 and E2 of the decoder and clock counter are connected to NAND gate 422. NAND gate 424 has connected thereto output line EN13 and output lines A2, B2, C2 and D2. The lines connected to NAND gate 426 are output lines EN14, C2 ane D2 and the lines connected to NAND gate 428 are output lines EN15, B2 and C2.

The output of NAND gate 430 is connected via line 432 to an inverter 434 and via line 436 to delay means 438. Output line 440 of the delay 438 has generated thereon a DELAY CLK signal.

The enabling of any one of gates 400 through 428 causes the NAND gate 430 to be disabled. That is, each of gates 400 through 428 are normally disabled thereby causing the output thereof to be high. Since each of the inputs to NAND gate 430 is, therefore, high, gate 430 is normally enabled thereby providing a low signal to inverter 434 which causes a high output signal on line 60. Thus, if any of gates 400 through 428 are enabled, the output thereof goes low thereby causing the NAND gate 430 to be disabled and thereby causing the output on lines 432 and 436 to go high which causes output line 60 to go low and output line 440 to go high after a delay caused by the delay means 438.

In order that one of the NAND gates 400 through 428 be enabled, the enabling signal (EN1 through EN15) associated therewith must go high and a predetermined count must be reached in the clock counter 28. For example, when EN15 is enabled, it indicates that a timepiece having a 3,600 tick per hour tick rate is being tested. Accordingly, in a period of 6 seconds, if the timepiece is accurate, 6 tick pulses should be received and counted by the clock counter 28. Accordingly, output lines B2 and C2 of the clock counter 28 are used in combination with the EN15 output line as inputs to NAND gate 428. When the output line C2 goes high and the output line B2 goes high, it indicates the count of 6 in the clock counter and the NAND gate 428 is enabled when line EN15 also has a high output thereon.

The following chart shows the conditions that will enable each of the gates 400 through 428:

| Nand Gate | Tested Timepiece Tick Rate | Enabling Signal from Decoder 30 | Count in Counter 28 |
|---|---|---|---|
| 400 | 360 Hz | EN1 | 2160 |
| 402 | 300 Hz | EN2 | 1800 |
| 404 | 36,000 T/hr. | EN3 | 60 |
| 406 | 28,800 T/hr. | EN4 | 48 |
| 408 | 21,600 T/hr. | EN5 | 36 |
| 410 | 21,000 T/hr. | EN6 | 35 |
| 412 | 19,800 T/hr. | EN7 | 33 |
| 414 | 18,000 T/hr. | EN8 | 30 |
| 416 | 17,280 T/hr. | EN9 | 29* |
| 418 | 16,200 T/hr. | EN10 | 27 |
| 420 | 14,400 T/hr. | EN11 | 24 |
| 422 | 12,000 T/hr. | EN12 | 20 |
| 424 | 9,000 T/hr. | EN13 | 15 |
| 426 | 7,200 T/hr. | EN14 | 12 |
| 428 | 3,600 T/hr. | EN15 | 6 |

The following example shows how the chart is used:

If a timepiece is tested having a tick rate of 16,200 T/hr., gate 418 is enabled when line EN10 goes high and the count in counter 28 reaches 27 thereby causing the signal on lines A2, B2, D2 and E2 to go high. It should be noted that there is an asterisk next to the number 29 on the line even with gate 416. The asterisk is provided to indicate that the count of 29 represents only the count in counter 28 that enables gate 416 in combination with the high EN9 signal. That is, each of the remaining counts in the column under the count in counter 28, with the exception of the count of 29, represents the number of ticks that are generated by the timpieces during a 6 second interval when the timepieces are accurate. However, the asterisk next to the 29 is provided to indicate that the 29 does not represent the number of ticks that a timepiece having a tick rate of 17,280 T/hr. would generate during a 6 second interval. 29 ticks are actually provided in a period of approximately 6.06 seconds.

Referring back to FIG. 6, it can be seen that flip-flop 268 provides an output line from its Q output which extends upwardly in FIG. 6 and is labeled $\overline{EN10}$. As best seen in FIG. 3, the $\overline{EN10}$ line and the EN9 line are used in combination with the standard counter to extend the period of time for generating the $\overline{STD}$ signal on line 130. That is, the $\overline{EN10}$ and the EN9 lines are connected to input lines 138 and 140, respectively, of the NAND gate 114. When the decoder 30 detects a timepiece having a tick rate of 17,280 ticks per hour, the flip-flop 266 is the last of the flip-flops which is triggered to the reset state. Accordingly, both EN9 and $\overline{EN10}$ signals are high only when the tick rate of 17,280 ticks per hour is detected. Accordingly, the NAND gate 114 is enabled by the EN9 and $\overline{EN10}$ lines. NAND gate 114 is enabled each time the NAND gate 116 is disabled. The enabling of NAND gate 114 prevents NAND gate 118 from being enabled after 6 seconds. The timing of the signals applied to NAND gate 16 causes the NAND gate 114 to be enabled for 0.06 second after the 6 second period has elapsed thereby causing the NAND gate 118 to remain disabled for an extra 0.06 second. Thus, after 6.06 seconds, the $\overline{STD}$ signal is generated when the timepiece tested has a tick rate of 17,280 ticks per hour.

Accordingly, it can be seen that since there is not an even number of ticks generated in 6 seconds by a timepiece having a 17,280 tick per hour rate, it is necessary to extend the 6 second interval so that clock counter 28 can be used.

Figure 9:
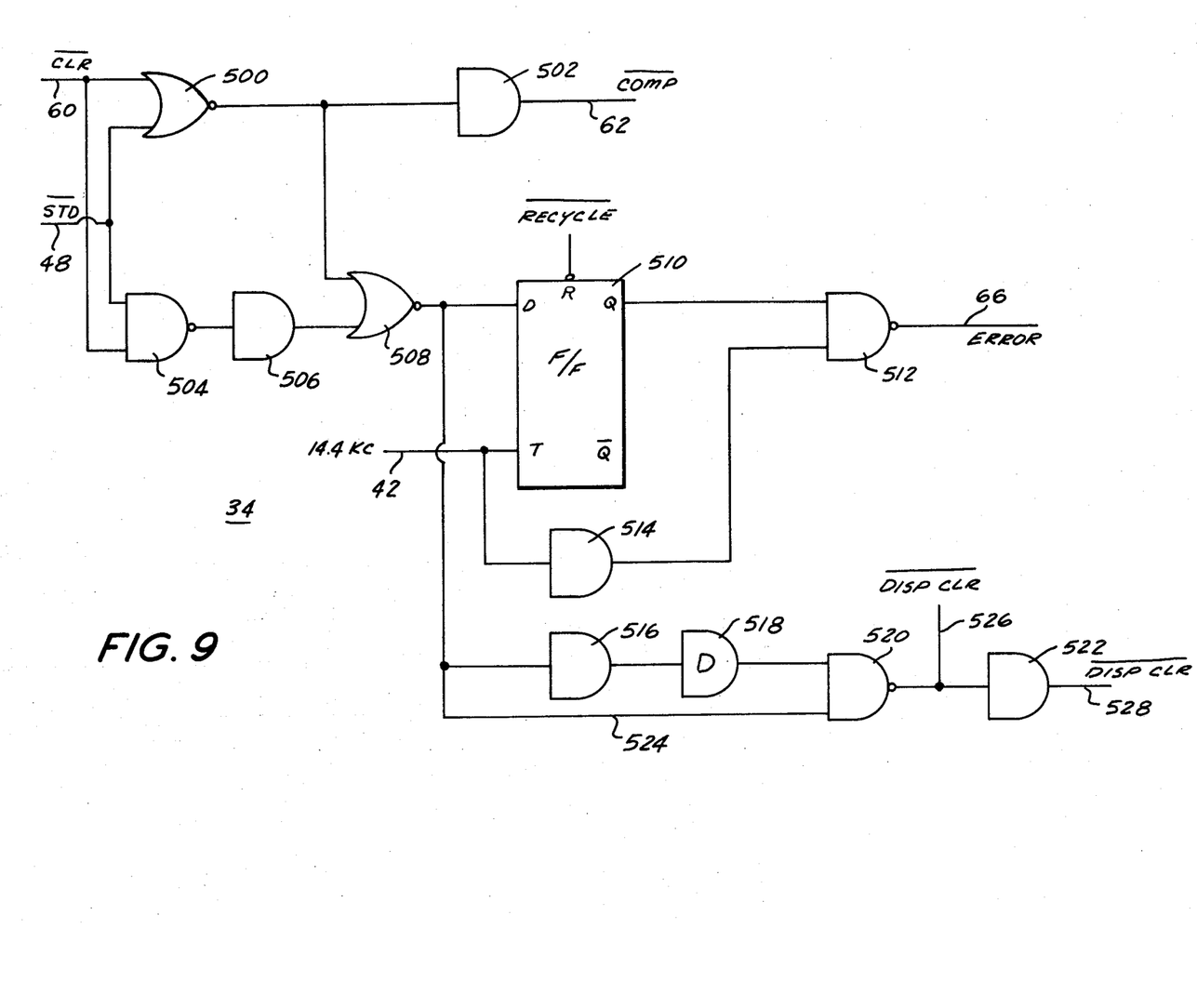
FIG. 9 is a schematic block diagram of the comparator used for determining the accuracy of the timepiece.

The comparator 34 is shown in FIG. 9. Comparator 34 basically comprises a NOR gate 500, an inverter 502, NAND gate 504, inverter 506, NOR gate 508, flip-flop 510, NAND gate 512, a pair of inverters 514 and 516, a delay means 518, NAND gate 520 and inverter 522. NOR gate 500 and NAND gate 504 are connected in an exclusive OR fashion with NOR gate 508 and inverter 506. That is, the lines 48 and 60 from the standard counter 22 and the 6 second logic 32, respectively, are connected to both inputs of NOR gate 500 and NAND gate 504. The output of NOR gate 500 is connected to inverter 502 to a first input of NOR gate 508. The output of NAND gate 504 is connected to the input of inverter 506, the output of which is connected to the other input of NOR gate 508. The output of NOR gate 508 is connected to the D input of flip-flop 150. The 14.4 KH signal provided on line 42 from the standard frequency oscillator is connected to the trigger input of flip-flop 510. The recycle line is connected to the reset input of flip-flop 510.

The 14.4 KH pulse signal on line 42 is also connected via inverter 514 to the input of NAND gate 512. The second input of NAND gate 512 is connected from the Q output of flip-flop 510. The output of NOR gate 508 is connected via inverter 516 and delay means 518 to a first input of NAND gate 520 and via line 524 to a second input of NAND gate 520.

The output of NAND gate 520 is provided on line 526 and output line 528 via inverter 522. The signal on output line 526 when it is enabled is the $\overline{DISP\ CLR}$ signal. The output enabling signal on line 528 is the DISP CLR signal.

The output of the inverter 502 is provided on line 62 which is labeled $\overline{COMP}$.

When the $\overline{CLK}$ and $\overline{STD}$ signals are generated simultaneously on lines 60 and 48, respectively, the comparator operates as follows:

The NOR gate 500 is disabled because the inputs thereto go low thereby causing a high output which is inverted by inverter 502 to provide a low signal or the enabling $\overline{COMP}$ signal. Also, the NAND gate 504 is disabled thereby providing a low input signal to NOR gate 508 from inverter 506. However, since the NOR gate 500 is disabled, the other input to NOR gate 508 is high thereby causing a low signal to be provided to the D input of flip-flop 510. Accordingly, the pulses on line 42 from the 14.4 KH oscillator do not cause the flip-flop to be set. As long as the flip-flop 510 remains in its reset position, the Q output thereof causes the disabling of NAND gate 512 and, thus, no error purlses are provided on output line 532 of NAND gate 512.

Thus, the simultaneous generation of the $\overline{CLK}$ and $\overline{STD}$ signals indicates that the timepiece tested in accurate.

In the case when the $\overline{CLK}$ signal on line 60 is received prior to the $\overline{STD}$ signal on line 48, the NOR gate 500 remains enabled until the $\overline{STD}$ signal is also received. As long as the $\overline{CLK}$ signal is present and the $\overline{STD}$ signal is not present, the NOR gate 500 remains enabled thereby causing gate 400 to remain enabled and thereby providing a low input signal to NOR gate 508. However, when the $\overline{CLK}$ signal on line 60 is received by NAND gate 504, NAND gate 504 is disabled thereby causing another low input to NOR gate 508 thereby providing a high output signal to the D input of flip-flop 510 via line 64. Thus, upon the next 14.4 KH pulse on line 42, the flip-flop 510 is set thereby causing the enabling of gate 512 to pass each pulse provided by the 14.4 KH oscillator through the inverter 514.

The flip-flop 510 remains in the set state until the $\overline{STD}$ signal is also received which thereby causes the NOR gate 500 to be disabled and thereby provides a high input to NOR gate 508 which causes the enabling thereof and the lowering of the input to the D input of flip-flop 510. The lowering of the D input to flip-flop 510 causes the next pulse to the trigger input of flip-flop 510 to change the state and thereby cause the disabling of NAND gate 512. It should, therefore, be noted that the NAND gate 512 thereby passes 14.4 KH pulses to line 532 as long as only the CLK signal is received.

In the case that the $\overline{STD}$ signal is received prior to the $\overline{CLK}$ signal, NOR gate 500 again remains in the enable state and NAND gate 504 becomes disabled. As soon as NAND gate 504 becomes disabled without the disabling of NOR gate 500, NOR gate 508 is again disabled causing the flip-flop 510 to have a high input applied to the D input thereof. The 14.4 KH pulse on line 42 triggers the change of state of flip-flop 510 enabling the NAND gate 512 to pass 14.4 KH pulses to line 532 until the $\overline{CLK}$ signal is received on line 60. As soon as the $\overline{CLK}$ signal is received on line 60, the NOR gate 500 is also disabled thereby causing the NOR gate 508 to become enabled and thereby causing the next 14.4 KH pulse on line 42 to change the state of flip-flop 510 which prevents the NAND gate 512 from passing further 14.4 KH pulses to line 532.

It can, therefore, be seen that the $\overline{COMP}$ signal on line 530 is generated as soon as $\overline{CLK}$ and $\overline{STD}$ are simultaneously low signals. Also, the output of NOR gate 508 goes high whenever the inputs to lines 60 and 48 are not equal. Of course, the signals on lines 60 and 48 are not equal as soon as either the $\overline{CLK}$ or $\overline{STD}$ signal is received prior to the other.

As soon as the NOR gate 508 is disabled, the output thereof is provided via two paths to NAND gate 520. Since NAND gate 520 is normally disabled, the output signal on line 526 is normally high and the output signal on line 528 is normally low. Also, because the NOR gate 508 is normally enabled, input line 524 is normally low and the output of delay means 518 is normally high. When the NOR gate 508 is disabled, the high pulse on the output line thereof is received immediately via line 524 at the input of NAND gate 520 thereby enabling NAND gate 520. However, the high signal is provided via inverter 516 which inverts the same to a low signal at the input of the delay means 518. The delay means 518 is preferably a $10^{-7}$ second (100 nanosecond) delay means, and, thus, as soon as the low signal is provided to the other input of NAND gate 520, the NAND gate 520 is disabled. Thus, the generation of the high signal by NAND gate 508 causes a pulse of approximately 100 nanosecond duration to be generated on line 526 and a similar positive going pulse on line 528.

Figure 10:
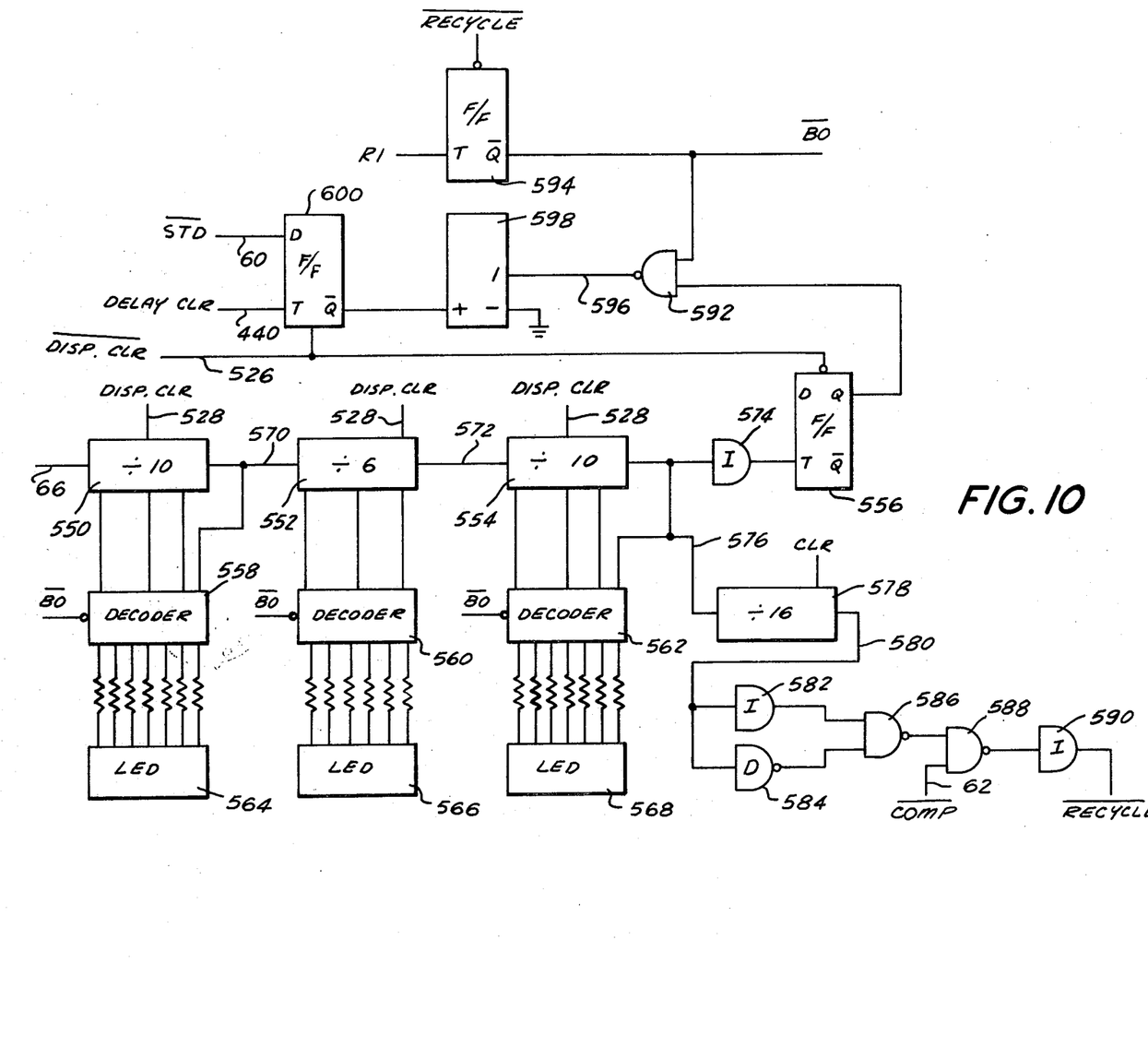
FIG. 10 is a schematic block diagram of the display counter, the display means associated therewith and the end of cycle logic.

The display counter and end of cycle logic is shown in FIG. 10.

The display counter basically comprises a ÷10 counter 550, a ÷6 counter 552 and a ÷10 counter 554. The counter also includes a flip-flop 556.

The ÷10 counters 550 and 554 are both preferably comprised of binary counters which are set to recycle at 10. Similarly, the ÷6 counter 552, is preferably comprised of a binary counter which is set to recycle at 6.

The output lines of the counters 550, 552 and 554 are each connected to a decoder. ÷10 counter 550 is connected via its output lines to decoder 558, ÷6 counter 552 is connected via its output line to decoder 560 and ÷10 counter 554 is connected via its output lines to decoder 562. Each of the decoders 558, 560 and 562 act to convert a binary to a seven line segment code. The seven line segment code is provided on the resistive output lines of the decoders 558, 560 and 562 and are provided to light emitting diode numerical displays 564, 566 and 568, respectively, which are connected thereto. The displays each have the light emitting diodes in a figure 8 disposition. By providing high signals on suitable combinations of the output lines, the various different numerals are displayed in accordance with the binary code in the counters 550, 552 and 554.

The ÷10 counter 550 includes a step input line which is connected to output line 532 of the NAND gate 512 of the comparator. The most significant stage of the ÷10 counter 550 is connected via line 570 to the step input of ÷6 counter 552. The most significant stage of the ÷6 counter 552 is connected via output line 572 to the ÷10 counter 554. The output line of the most significant stage of ÷10 counter 554 is connected to an inverter 574 via line 576 to the step input of a "16" counter 578.

÷16 counter 578 has a CLR input line and an output line from the most significant stage which is connected via line 580 to an inverter 582 and a delay means 584. The output of inverter 582 is connected to a first input of NAND gate 586 and the output of delay means 584 is connected to the other input of NAND gate 586. The output of NAND gate 586 is connected to a first input of NAND gate 588 and the other input of NAND gate 588 is received via the $\overline{COMP}$ line 62 from the comparator 34 which indicates that both the $\overline{CLK}$ and the $\overline{STD}$ signals have been received by the counter.

The output of NAND gate 588 is connected to inverter 590 which is connected to the $\overline{RECYCLE}$ output line which enables the overall circuitry to be ready for the next cycle. The reset or clear inputs of each of the counters 550, 552 and 554 are connected via line 528 to the output of inverter 522 of FIG. 9. Thus, as soon as an error has been indicated in the clockpiece being tested, the display counters 550, 552 and 554 are cleared.

The flip-flop 556 has its trigger input connected to the output of inverter 574 and its Q output connected to the input of a NAND gate 592.

The reset input to flip-flop 556 is connected to the DISP CLR line 526 from the output of NAND gate 520 in FIG. 9. Thus, the flip-flop 556 is also reset at the time that an error is detected in the timepiece being tested. The other input to NAND gate 592 is connected to the $\overline{Q}$ output of flip-flop 594.

Flip-flop 594 is used to control the blanking feature which prevents decoders 558, 560 and 562 from providing the count of the counters 550, 552 and 554 to the display 564, 566 and 568 during the time that the counters are being stepped and the accuracy of the watch is being determined. The trigger input of flip-flop 594 is connected to line R1 of the standard counter 22. The flip-flop 594 is triggered by R1 going high after approximately 5 seconds.

The flip-flop 594 also includes a $\overline{RECYCLE}$ input so that as the end of the cycle is reached, the flip-flop is reset. The output of NAND gate 592 is connected via line 596 to a display 598 which has light emitting diodes therein for displaying the numeral 1 and either a + or a − when the symbols are appropriate. The 1 portion of display 598 is controlled by the NAND gate 592. When the NAND gate 592 is enabled, the 1 in the display is illuminated.

Normally the − sign in display 598 is illuminated unless the flip-flop 600 is set. When flip-flop 600 is set, the $\overline{Q}$ output thereof which is connected to the display 598 causes the + to be illuminated rather than the −. Flip-flop 600 has its D input connected to the $\overline{STD}$ signal provided on line 60 and the trigger input connected to the DELAY CLK signal provided from line 440 of the 6 second logic shown in FIG. 8.

The operation of the circuitry in FIG. 10 is best understood if it is assumed that there is an error in the timepiece being tested and, accordingly, 14.4 KH pulses are provided on line 66 to ÷10 counter 550. It should be noted that the 14.4 KH pulse rate is specifically chosen for applying error pulses to the display counter in view of the fact that for each 14.4 KH pulse generated in the interval between the arrival of the $\overline{STD}$ and the $\overline{CLK}$ pulses, a second of watchpiece error per day is present. Accordingly, the ÷10 counter 550 acts to count the unit seconds of error provided by pulses on line 66. The ÷6 counter 552 acts as the 10 second counter and the ÷10 counter 554 acts as the minutes counter. If more than 10 minutes of error have been counted by the counters 550, 552 and 554, the recycling of the ÷10 counter 554 causes a leading pulse to the trigger input of flip-flop 556 causing the flip-flop 556 to be set. The setting of flip-flop 556 causes an enabling signal to be provided to the NAND gate 592. Flip-flop 556 is used to remember a clockpiece error of more than 10 minutes. The display 598 has the 1 illuminated when flip-flop 556 has been set. The 1 is not displayed until the $\overline{BO}$ signal goes high and thereby enables NAND gate 592.

It can, therefore, be seen that the display counter measures the error of a timepiece up to 20 minutes per day.

The counter 578 is also stepped each time the ÷10 counter 554 is recycled. Thus, assuming an extra pulse was received by the pick-up unit while a timepiece is being tested, the amount of errors that it would create could easily be an hour or longer. This is determined by the ±16 counter 578 which is constantly stepped and, therefore, provides a negative going voltage on line 580 after the counter 578 has been pulsed enough times to recycle thereby causing the output of the inverter 582 to go positive. The low level on line 580, however, is delayed by the delay means 584 to the other input of the NAND gate 586 thereby causing the NAND gate 586 to be enabled until such time as the delay means 584 passes the lower signal to the other input of NAND gate 586.

Therefore, the NAND gate 586 generates a negative going pulse which is provided to disable the NAND gate 588 which generates an output signal which is inverted by inverter 590 and provides the low $\overline{RECYCLE}$ signal to prepare the circuitry for the next cycle. The $\overline{RECYCLE}$ signal is also provided to the reset input of flip-flop 594 thereby causing the $\overline{Q}$ output of flip-flop 594 to go high and thereby taking off the inhibiting $\overline{BO}$ signal which is applied to the decoders 558, 560 and 562 and also enables the NAND gate 592 if the Q output of flip-flop 556 is also at a high level. Thus, the contents of the display counters 550, 552 and 554 and the flip-flop 556 are displayed in the displays 564, 566, 568 and 598 after the $\overline{RECYCLE}$ signal has been generated.

The $\overline{RECYCLE}$ signal is also generated when the $\overline{COMP}$ signal is developed on line 62 and applied to NAND gate 588. This also causes the inverter 590 to provide the negative $\overline{RECYCLE}$ signal.

Flip-flop 600 is used to control the + or − display of display 598. The flip-flop 600 is normally in the reset state and causes the ± portion of the display 598 to normally read −. Flip-flop 600 can be triggered to the set state until the $\overline{STD}$ signal is received on line 60. Accordingly, the flip-flop 600 is changed in state whenever the $\overline{CLK}$ signal goes low prior to the $\overline{STD}$ signal. The DELAY CLK signal is delayed from the $\overline{CLK}$ signal in order to prevent the arrival of the leading edge at the trigger input of the flip-flop 600 at the same time that the $\overline{DISP\ CLR}$ pulse is applied to the flip-flop.

It should be understood that other types of timepieces can be used with the instant invention even where the tick rate is different from the ones specified herein. Charts can be prepared which are usable with a clock rate close to the tested timepiece and the charts consulted for converting the displayed error to the actual error.

It should also be understood that the watchpiece testing device embodying the invention can be modified to directly measure the inaccuracy of watchpieces having different tick rates than those specified hereinabove. These changes can be accomplished by either adding another stage to the decoder or changing the input circuit between the trigger of one of the stages of the decoder and the output of the standard counter. The output stages of the standard counter connected to the input circuit of the decoder are determined by the amount of time that the timepiece normally takes to generate a predetermined number of ticks. Similarly, the 6 second logic in FIG. 8 is modified to have another NAND gate which is enabled in accordance with the number of ticks generated by the watchpiece when it is accurate during a 6 second interval.

It can, therefore, be seen that a new and improved timepiece testing device has been provided. The device includes a decoder for automatically recognizing the type of timepiece being tested and also has a novel display for indicating the type of timepiece that is being tested. In addition, display means are also provided for indicating the number of units that the timepiece will gain or lose during a day in minutes and seconds.

Moreover, means are provided to enable the unit to recycle when the timepiece and being tested is either so inaccurate that more than one hour a day is gained or lost or the receipt of spurious pulses causes the recycling of the unit so that the timepiece can be immediately retested.

Without further elaboration, the foregoing will so fully illustrate my invention that others may, by applying current or future knowledge, readily adapt the same for use under various conditions of service.

What is claimed as the invention is:

1. In a measuring device for determining the accuracy of a timepiece having means for picking up the tick in a timepiece movement and generating a tick pulse signal for each tick of said timepiece, a standard frequency generator and first counting means responsive to said standard generator for generating signals at predetermined periods of time, second counting means responsive to said tick signals for counting a predetermined number of said tick signals, decoding means responsive to said second counting means and said signals from said first counting means for determining said indicating the correct tick rate of said timepiece, third counting means for counting said tick signals, logic means responsive to said decoding means and said third counter for generating an output signal after said timepiece has ticked a predetermined number of times based on the number of ticks required for said timepiece in a predetermined time interval at its correct tick rate, and comparing means responsive to said output signal and to said first counting means for determining the accuracy of said timepiece.

2. The measuring device of claim 1 wherein said first counting means generates a signal after said predetermined time interval has elapsed.

3. The measuring device of claim 2 wherein said measuring device includes gating means, said gating means being controlled by said comparing means, said comparing means opening said gate whenever said comparing means has received only one of said output and said time interval signals from said logic means and said first counting means and not until both said output signal and said time interval signal from said first counting means are received is said gating means closed.

4. The measuring device of claim 3 wherein a standard oscillator is connected to said gate, said gate passing pulses from said standard oscillator as long as it is open to provide means for determining the number of minutes and seconds that the timepiece gains or loses during a day.

5. The measuring device of claim 4 wherein a counter is provided to count said pulses from said standard oscillator.

6. The measuring device of claim 5 and further including recycle means responsive to said counter for restarting said measuring device when a predetermined number of said oscillator pulses are passed by said gating means.

7. A measuring device as called for in claim 6 and further including means for determining the accuracy of a watchpiece having a movement which does not provide an even number of ticks during said predetermined time interval.

8. In a measuring device for determining the accuracy of a timepiece having means for picking up the tick in a timepiece movement and generating a tick pulse signal for each tick of said timepiece, a standard frequency generator and first counting means responsive to said standard generator for generating signals at predetermined periods of time, and after said predetermined time interval has elapsed, second counting means responsive to said tick signals for counting a predetermined number of said tick signals, decoding means responsive to said second counting means and said signals from said first counting means for determining and indicating the correct tick rate of said timepiece, third counting means for counting said tick signals, logic means responsive to said decoding means and said third counter for generating an output signal after said timepiece has ticked a predetermined number of times based on the number of ticks required for said timepiece in a predetermined time interval at its correct tick rate, comparing means responsive to said output signal and to said first counting means for determining the accuracy of said timepiece, gating means, said gating means being controlled by said comparing means, said comparing means opening said gate whenever said comparing means has received only one of said output and said time interval signals from said logic means and said first counting means and not until both said output signal and said time interval signal from said first counting means are received is said gating means closed, a standard oscillator, said standard oscillator connected to said gate, said gate passing pulses from said standard oscillator as long as it is open to provide means for determining the number of minutes and seconds that the timepiece gains or loses during a day, a fourth counter for counting said pulses from said standard oscillator, recycle means responsive to said fourth counter for restarting said measuring device when a predetermined number of said oscillator pulses are passed by said gating means, means for determining the accuracy of a watchpiece having a movement which does not provide an even number of ticks during said predetermined time interval, said means for determining the accuracy of a watchpiece having a movement which does not provide an even number of ticks during said predetermined time interval includes means responsive to said decoding means for changing the time at which said first counting means generates said time interval signal.

9. The measuring device of claim 1 wherein said decoding means comprises a plurality of stages, each of said stages controlling a light emitting diode, said stages each representing a different type of watchpiece, said stages being sequentially energized until the stage representative of the watchpiece being tested is reached.

10. The measuring device of claim 9 wherein said light emitting diodes are sequentially energized with only the light emitting diode connected to said representative stage being illuminated after said timepiece is recognized.

* * * * *